United States Patent
Sabuncu et al.

(10) Patent No.: US 7,561,757 B2
(45) Date of Patent: Jul. 14, 2009

(54) IMAGE REGISTRATION USING MINIMUM ENTROPIC GRAPHS

(75) Inventors: Mert Rory Sabuncu, Lawrenceville, NJ (US); Christophe Chefd'hotel, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 542 days.

(21) Appl. No.: 11/236,161

(22) Filed: Sep. 27, 2005

(65) Prior Publication Data

US 2006/0093240 A1    May 4, 2006

Related U.S. Application Data (60) Provisional application No. 60/623,058, filed on Oct. 28, 2004.

(51) Int. Cl.
*G06K 9/32* (2006.01)
*G06K 9/00* (2006.01)

(52) U.S. Cl. .................... 382/294; 382/128

(58) Field of Classification Search ............ 382/294
See application file for complete search history.

(56) References Cited

OTHER PUBLICATIONS

Ma, Image registration with minimum spanning tree algorithm, 2000, Image Processing, Proceedings. 2000 International Conference on, vol. 1, On pp. 481-484.*
Pluim, Image Registration by Maximization of Combined Mutual Information and Gradient Information, 2000, IEEE Transactions on Medical Imaging, vol. 19, No. 8.*
Prim, Shortest connection networks and some generalizations, 1957, Bell Syst. Tech. Journ., vol. 36, pp. 1389-1401.*
Hero, Applications of entropic spanning graphs, Sep. 2002, IEEE, 85-95.*

\* cited by examiner

*Primary Examiner*—Jingge Wu
*Assistant Examiner*—Max Shikhman
(74) *Attorney, Agent, or Firm*—Donald B. Paschburg; F. Chau & Associates, LLC (57) ABSTRACT

In a method of aligning images, a first image and a second image are sampled to a plurality of joint feature pairs. A minimum entropic graph is computed using the joint feature pairs. Using a distance measure, the total length of the minimum entropic graph is measured to obtain a dissimilarity measure. The dissimilarity measure is minimized for updating the geometric transformation.

4 Claims, 6 Drawing Sheets

IMAGE REGISTRATION USING MINIMUM ENTROPIC GRAPHS

CROSS-REFERENCE TO RELATED APPLICATION

This application claims the benefit of U.S. Provisional Application Ser. No. 60/623,058, filed Oct. 28, 2004 and entitled "Optimization of MST-Based Entropic Similarity Measures for Image Registration," the content of which is herein incorporated by reference in its entirety.

BACKGROUND OF THE INVENTION

1. Field of the Invention

The present invention relates to image registration, and more particularly to methods and systems for aligning images using minimum entropic graphs.

2. Description of the Related Art

Registration or geometric alignment of images is a fundamental problem in image processing. Registration can be defined as the process of determining the point-to-point correspondence between two images. In essence, image registration is the process of aligning images so that corresponding features can be easily related. Registration algorithms find widespread use in image-processing applications. Typical applications include medical/biomedical image analysis, computer vision and military applications. In many such applications it is necessary to register multiple images of the same scene acquired by different sensors, or images taken by the same sensor but at different times or from different viewpoints. For example, it is common for medical images to be captured by imaging the same patient with different modalities or a single modality at different times. Goshtasby provides image registration techniques for remote sensing, industrial and medical applications and presents their underlying algorithms. Goshtasby, A. Ardeshir, *2-D and 3-D Image Registration: for Medical, Remote Sensing, and Industrial Applications,* John Wiley & Sons, Inc., February 2005.

In recent years, medical imaging has experienced an explosive growth due to advances in imaging modalities such as X-rays, computed tomography (CT), Doppler ultrasound, magnetic resonance (MR), positron emission tomography (PET) and single photon emission tomography (SPET). Typically, medical images are made up of a rectangular array of small square or rectangular elements or pixels, each of which has an associated image intensity value. Registration makes it possible to compare information in a reference image and a sensed image (also known as a target image) pixel by pixel. Two-dimensional (2-D) slices can be combined to generate a three-dimensional (3-D) volumetric model, and many images are now acquired directly as 3-D volumes. Each pixel in the 2-D slices corresponds to a small volume element or voxel in the 3-D volume. Voxel-based registration algorithms have been successfully applied to a range of image types. Hajnal edits a collection of papers reviewing methods particularly suitable for registration of medical images. Hajnal, J. V., Hill, D. L. G., Hawkes, D. J., Eds., *Medical Image Registration,* CRC Press LLC, 2001.

The registration of multimodality images is fundamental to medical image interpretation and analysis. By registering multimodality images, the fusion of multimodality information becomes possible. For example, it is beneficial to visualize functional data overlaid on anatomical data in the study of brain function, in which MR images provide anatomical information and functional information can be obtained from PET images. By registering the MR and PET brain images, functional and anatomical information can be combined so that brain regions of abnormal function can be anatomically located. Similarly, a range of application areas exist for monomodality registration, such as treatment verification by comparison of pre- and post-intervention images.

Registration establishes correspondence between medical images and physical space in image-guided interventions. In recent years, image registration techniques have entered routine clinical use in image-guided neurosurgery systems and computer-assisted orthopedic surgery. For example, recent research shows that computer-aided systems with interactive display of 3D bone models created from preoperative CT studies and tracked in real time can improve the accuracy of orthopedic procedures.

Figure 1:
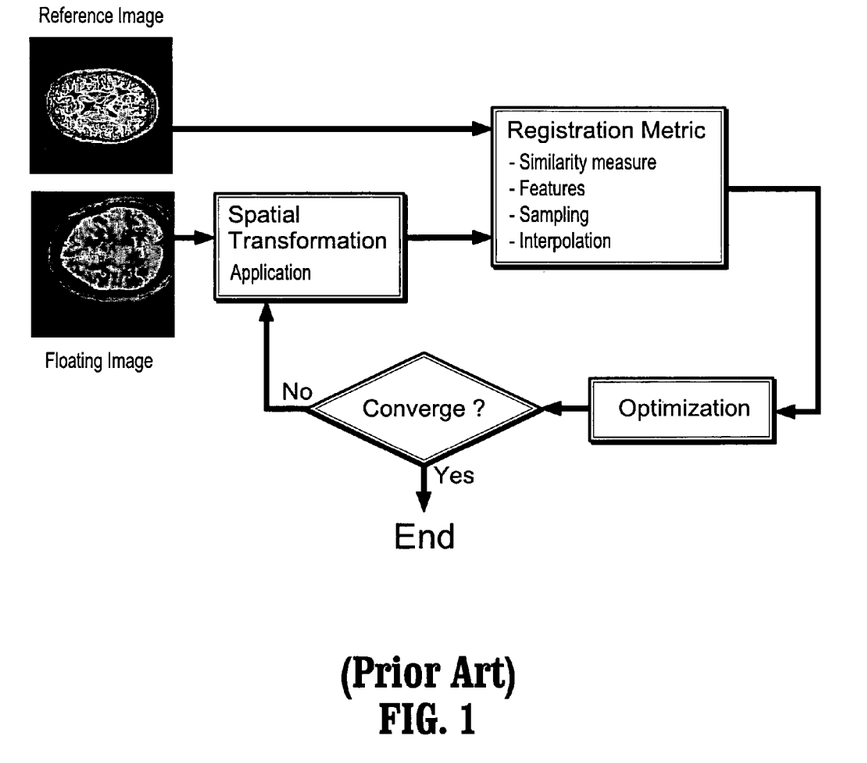
FIG. 1 is a flowchart illustrating a conventional registration algorithm.

FIG. 1 is a flowchart illustrating a conventional registration algorithm. The task of image registration has three key components: the registration metric that quantifies the similarity between two images; the transformation space that determines the allowed spatial transformations; and the optimization scheme for searching for the transformation that maximizes (or minimizes) the registration metric. Referring to FIG. 1, the registration algorithm tries to find a spatial transformation that "warps" the floating image to the geometry of the reference image. Digital image warping uses the geometric transformation techniques from such fields as medical imaging, computer vision, and computer graphics. The optimization scheme searches to find the best transformation that will maximize the similarity measure (also known in the art as an alignment measure) or minimize the dissimilarity measure. Nocedal, J. and Wright, S. J., *Numerical Optimization (Springer Series in Operations Research),* Springer-Verlag, 1999.

SUMMARY OF THE INVENTION

According to an exemplary embodiment of the present invention, a method is provided for aligning images. The method includes sampling a first image and a second image, obtaining a plurality of joint feature pairs; computing a minimum entropic graph using the joint feature pairs; measuring the total length of the minimum entropic graph using a distance measure, obtaining a dissimilarity measure; and minimizing the dissimilarity measure for updating the geometric transformation.

According to an exemplary embodiment of the present invention, a method is provided for multi-resolution image registration. The method includes building a multi-resolution representation of a first image and a second image to be aligned, obtaining a pyramid of images; and starting at a predetermined resolution, iteratively applying a registration method (a) a predetermined number of times or (b) until a convergence criterion is verified.

According to an exemplary embodiment of the present invention, a computer readable medium including computer code for aligning images is provided. The computer readable medium comprises: computer code for sampling a first image and a second image for obtaining a plurality of joint feature pairs; computer code for computing a minimum entropic graph using the joint feature pairs; computer code for measuring the total length of the minimum entropic graph using a distance measure for obtaining a dissimilarity measure; and computer code for minimizing the dissimilarity measure for updating the geometric transformation.

BRIEF DESCRIPTION OF THE DRAWINGS

The present invention will become more apparent to those of ordinary skill in the art when descriptions of exemplary embodiments thereof are read with reference to the accompanying drawings, of which.

DETAILED DESCRIPTION OF THE EXEMPLARY EMBODIMENTS

Hereinafter, the exemplary embodiments of the present invention will be described in detail with reference to the accompanying drawings.

Figure 2:
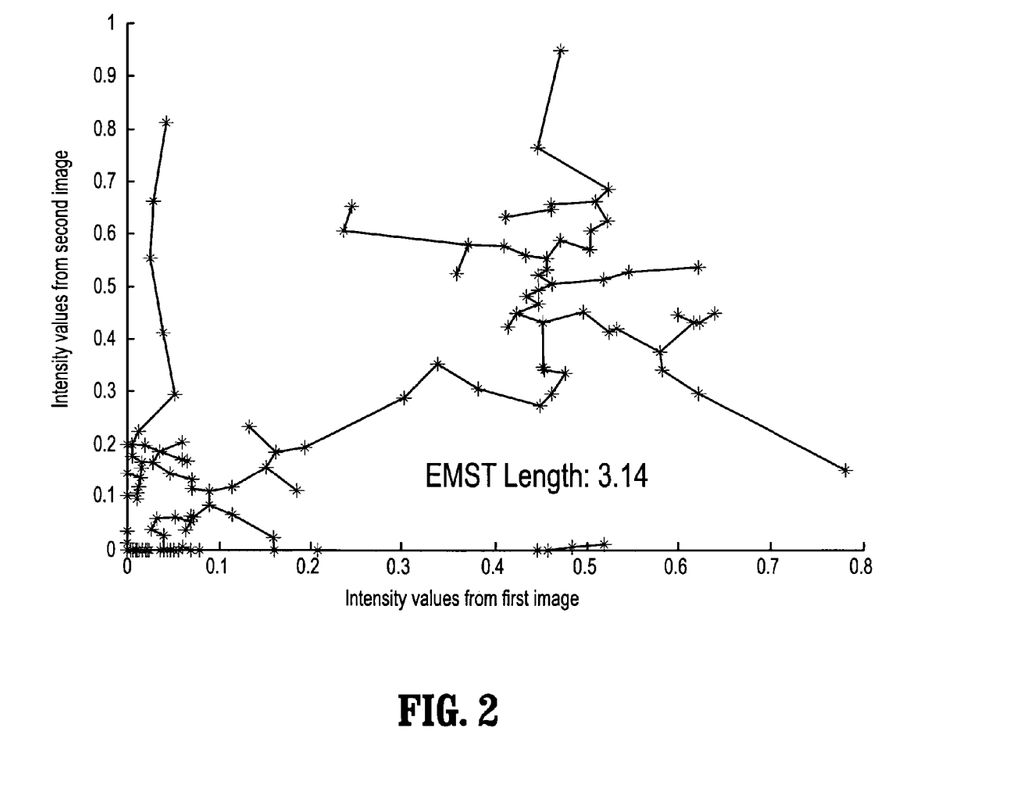
FIG. 2 is a diagram showing a minimum spanning tree-based registration metric, according to an exemplary embodiment of the present invention.

FIG. 2 is a diagram showing a minimum spanning tree-based registration metric, according to an exemplary embodiment of the present invention. The minimum spanning tree (MST) is a graph-theoretic technique for mapping the shortest path of nearest connections of a point set. Given a set $Z_n = \{z_1, z_2, \ldots, z_n\}$ of n iid vectors $Z_i$ in $R^d$ each with density f, a spanning tree is connected acyclic graph which passes through all coordinates associated with $Z_n$. In this graph all n points are connected by n−1 edges $\{e_i\}$. For a given real exponent $\gamma \in (0,1)$ the MST is the spanning tree that minimizes the total edge weight $$L(Z_n) = \min_{e \in T} \sum_e \|e\|^\gamma.$$

For example, for the point set shown in FIG. 2, the Euclidean MST length is 3.14.

Figure 3:
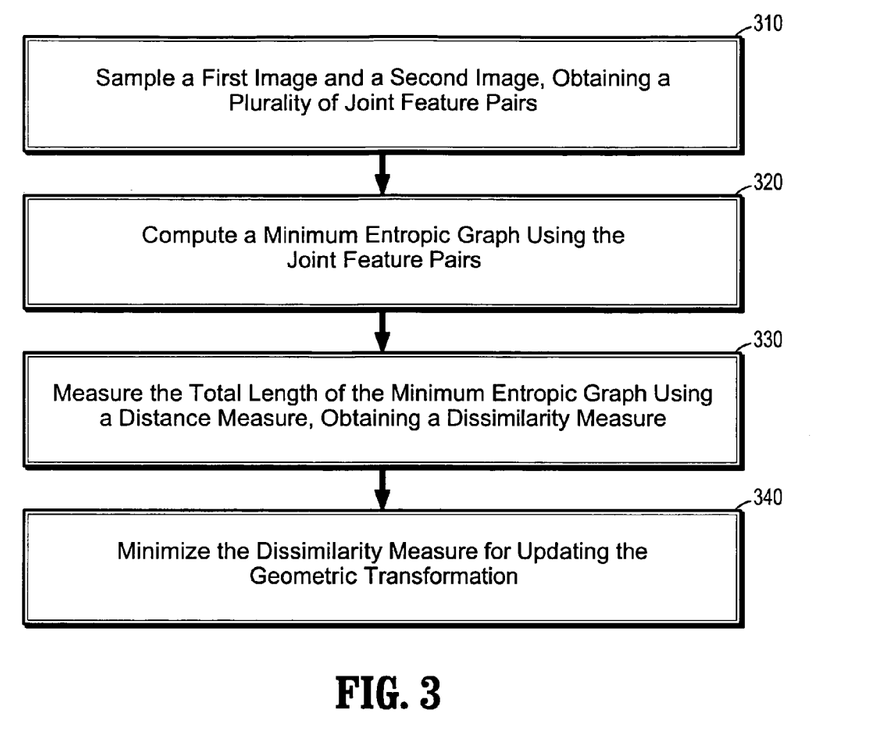
FIG. 3 is a flowchart showing a method of aligning images, according to an exemplary embodiment of the present invention.
Figure 4:
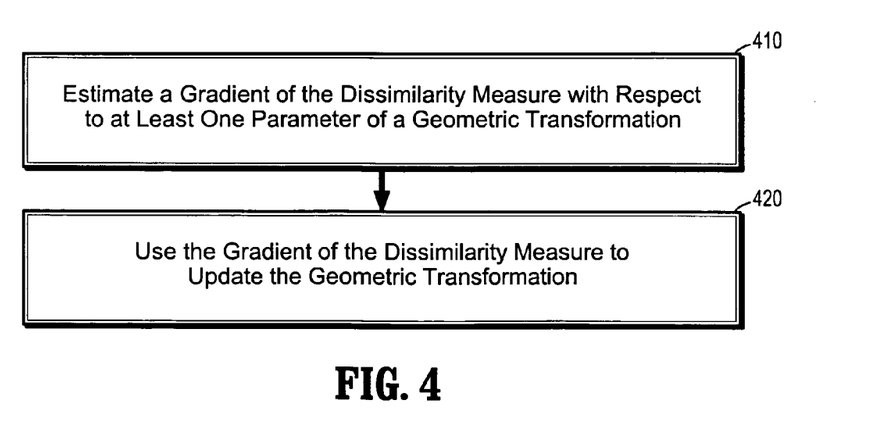
FIG. 4 is a flowchart showing a method of minimizing the dissimilarity measure, according to an exemplary embodiment of the present invention.

FIG. 3 is a flowchart showing a method of aligning images, according to an exemplary embodiment of the present invention. FIG. 4 is a flowchart showing a method of minimizing the dissimilarity measure, according to an exemplary embodiment of the present invention. Hereinafter, a method of aligning images is described with reference to FIGS. 3 and 4.

Referring to FIG. 3, in a step 310, a first image and a second image are sampled to obtain a plurality of joint feature pairs. The first and second images can be 2-D images, 3-D images, and/or higher-dimensional images. It is to be understood that any type of digital image should be suitable for implementing the present invention, including, but not limited to, medical images, e.g., 2-D medical images, 3-D medical images, and/or higher-dimensional medical images.

The joint feature pairs (i.e., "pairs" in the sense that one of the joint features is computed from the first image and the other of the pair is computed from the second image) can comprise any pair of vector-valued measures computed from the first and second images. According to one embodiment of the present invention, joint feature pairs can be gradient norm pairs, intensity value pairs (where each value is a function of intensity), gradient vector pairs, wavelet coefficients pairs, and/or Fourier coefficients pairs.

In a step 320, a minimum entropic graph is computed using the joint feature pairs. Preferably, computing a minimum entropic graph comprises computing a minimum spanning tree. A minimum spanning tree (MST) can be computed using Kruskal's method, Prim's method, or any other suitable technique. "Prim's method is defined in R.C. Prim, "Shortest connection networks and some generalization," Bell Syst. Tech. Journ., vol. 36, pp. 1389-1401, 1957.". "Kruskal's method is defined in J. B. Kruskal, "On the shortest spanning subtree of a graph and the traveling salesman problem," Proc. Amer. Math. Soc., vol. 7, pp. 48-50, 1956." Alternatively, a MST can be computed as described below. First, compute the Delaunay triangulation of a point set, thereby obtaining a Delaunay triangulation edge set. Then compute the MST using the Delaunay triangulation edge set and Kruskal's algorithm.

For higher-dimensional joint feature pairs, a MST can be computed by running the Delaunay triangulation on a reduced dimensional space (e.g., obtained by projection) and computing the MST of this triangulation in the original space. Given joint feature pairs in a higher-dimensional feature space, in one embodiment of the present invention, computing a minimum spanning tree comprises: computing the Delaunay triangulation in a reduced-dimensional feature space, wherein the reduced-dimensional feature space is obtained by projection, obtaining a triangulation; and computing the minimum spanning tree of the triangulation in the higher-dimensional feature space.

In a step 330, the total length of the minimum entropic graph is measured using a distance measure, whereby a dissimilarity measure is obtained. The minimum entropic graph can be a minimum spanning tree, a Delaunay triangulation, a traveling salesman problem (TSP) graph, and/or a k-nearest neighbor graph. It will be understood that any minimum entropic graph should be suitable for implementing the present invention. The distance measure is defined as a function of the Euclidean distance of the joint feature space. The dissimilarity measure is defined as the sum of the individual edge distances in the entropic graph, where the edge distances are functions of the Euclidean distance of the joint feature space.

In a step 340, the dissimilarity measure is minimized for updating the geometric transformation. It should be recognized that minimizing a dissimilarity measure is analogous to maximizing a similarity measure. It will be appreciated that any optimization scheme for minimizing the dissimilarity measure should be suitable for implementing the present invention. Hereinafter, an exemplary method of minimizing the dissimilarity measure is described with reference to FIG. 4.

In a step 410, a gradient of the dissimilarity measure is estimated with respect to at least one parameter of a geometric transformation. The estimate of the gradient is computed from the sum of the gradients of the individual distances between vertices of the graph. For the purposes of this disclosure, a gradient of the dissimilarity measure is a vector of partial derivatives of the dissimilarity measure with respect to the parameters of a geometric transformation.

In a step 420, the gradient of the dissimilarity measure is used to update the geometric transformation. In accordance with one embodiment of the present invention, using the gradient of the dissimilarity measure to update the geometric transformation includes using a gradient-based optimization scheme. For example, the gradient-based optimization scheme can be a gradient-descent type optimization scheme.

The method of aligning images, in accordance with at least one embodiment of the present invention, further includes a step of choosing an initial transformation. According to one embodiment of the present invention, user interaction is required to choose the initial transformation. Alternatively, user interaction is not required to choose the initial transformation.

Figure 5:
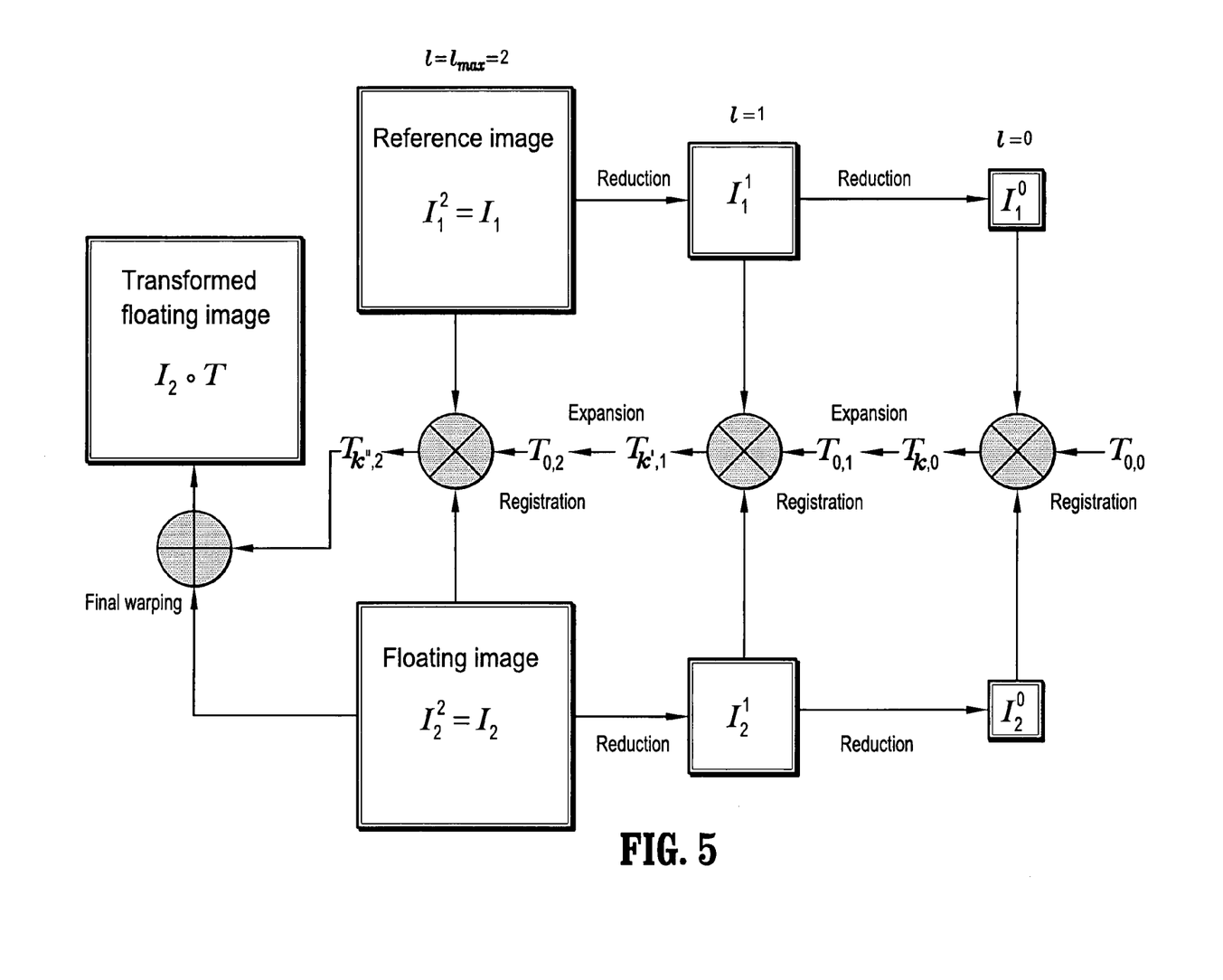
FIG. 5 is a diagram showing a method of image registration including a multi-resolution scheme, according to an exemplary embodiment of the present invention.
Figure 6:
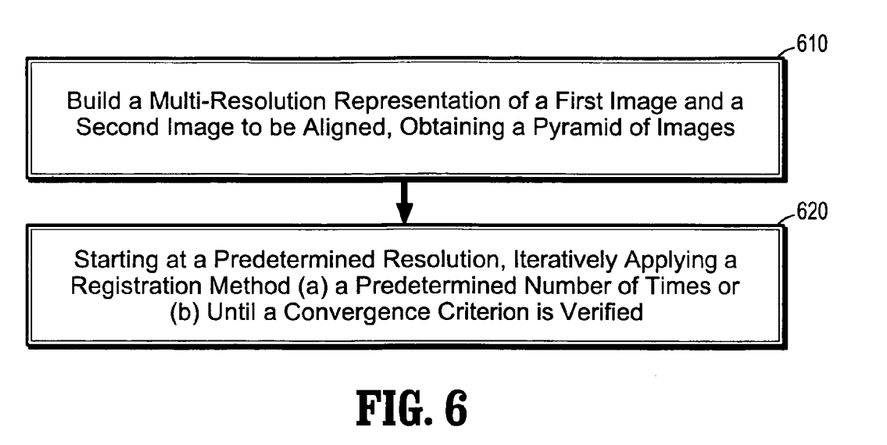
FIG. 6 is a flowchart showing a method of multi-resolution image registration, according to an exemplary embodiment of the present invention.
Figure 7:
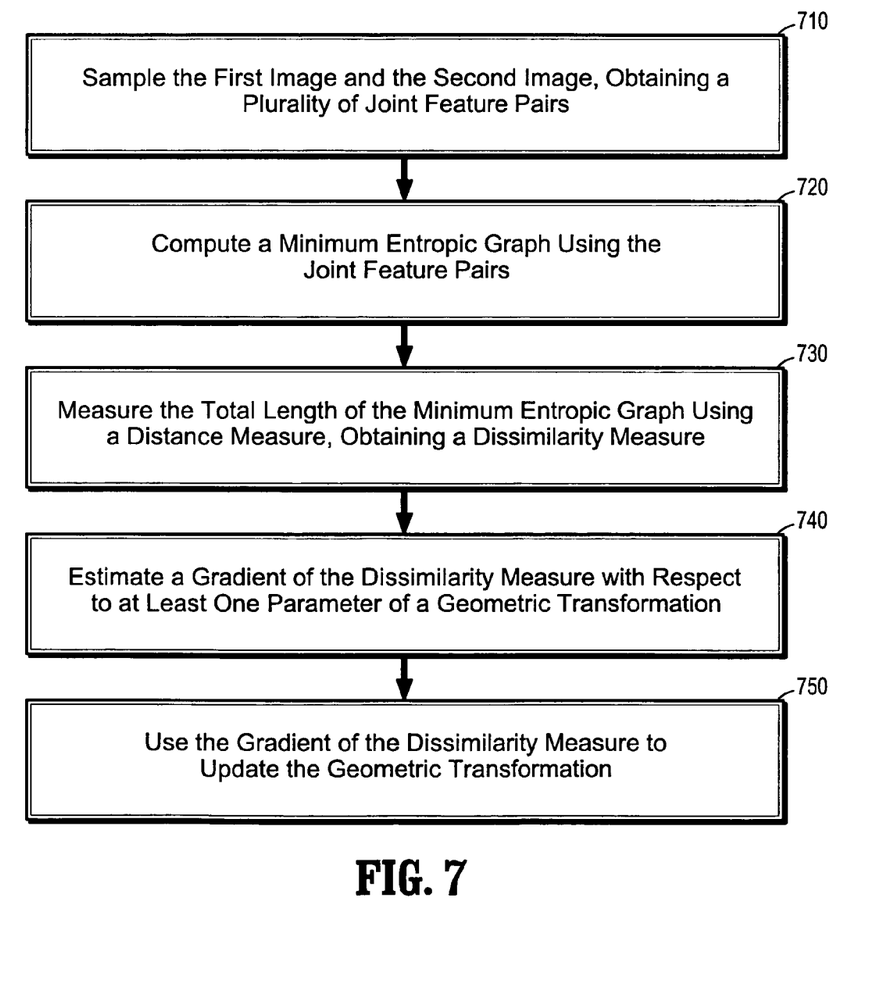
FIG. 7 is a flowchart showing a registration method, according to an exemplary embodiment of the present invention.

FIG. 5 is a diagram showing a method of image registration including a multi-resolution scheme, according to an exemplary embodiment of the present invention. FIG. 6 is a flowchart showing a method of multi-resolution image registration, according to an exemplary embodiment of the present invention. FIG. 7 is a flowchart showing a registration method, according to an exemplary embodiment of the present invention. Hereinafter, a method of multi-resolution image registration is described with reference to FIGS. 5 to 7.

Referring to FIG. 6, in a step 610, a multi-resolution representation of a first image and a second image to be aligned is built, obtaining a pyramid of images. For example, the pyramid of images shown in FIG. 5 includes three levels l, i.e., l=0, l=1 and l=2. Referring to FIG. 5, $T_{0,0}$ represents the initial transformation.

In a step 620, starting at a predetermined resolution, a registration method is iteratively applied (a) a predetermined number of times or (b) until a convergence criterion is verified. Preferably, the predetermined resolution is the lowest resolution. The convergence criterion, according to an exemplary embodiment of the present invention, is based on computational cost. Alternatively, the convergence criterion can be based on a change in at least one of the parameters of the geometric transformation being below a predetermined threshold.

The multi-resolution image registration method, in accordance with at least one embodiment of the present invention, includes a step of choosing an initial transformation. According to one embodiment of the present invention, user interaction is required to choose the initial transformation. Alternatively, user interaction is not required to choose the initial transformation.

Hereinafter an exemplary registration method is described with reference to FIG. 7. Referring to FIG. 7, in a step 710, a first image and a second image are sampled to obtain a plurality of joint feature pairs. The first and second images can be 2-D images, 3-D images, and/or higher-dimensional images. The joint feature pairs can comprise any pair of vector-valued measures computed from the first and second images. According to one embodiment of the present invention, joint feature pairs can be gradient norm pairs, intensity value pairs (where each value is a function of intensity), gradient vector pairs, wavelet coefficients pairs, and/or Fourier coefficients pairs.

In a step 720, a minimum entropic graph is computed using the joint feature pairs. Preferably, computing a minimum entropic graph comprises computing a minimum spanning tree. A minimum spanning tree (MST) can be computed using Kruskal's method, Prim's method, or any other suitable technique. Alternatively, a MST can be computed by first computing the Delaunay triangulation of a point set, thereby obtaining a Delaunay triangulation edge set, and then computing the MST using the Delaunay triangulation edge set and Kruskal's algorithm.

For higher-dimensional joint feature pairs, a MST can be computed by running the Delaunay triangulation on a reduced dimensional space (e.g., obtained by projection) and computing the MST of this triangulation in the original space. Given joint feature pairs in a higher-dimensional feature space, in one embodiment of the present invention, computing a minimum spanning tree comprises: computing the Delaunay triangulation in a reduced-dimensional feature space, wherein the reduced-dimensional feature space is obtained by projection, obtaining a triangulation; and computing the minimum spanning tree of the triangulation in the higher-dimensional feature space.

In a step 730, the total length of the minimum entropic graph is measured using a distance measure, whereby a dissimilarity measure is obtained. The minimum entropic graph can be a minimum spanning tree, a Delaunay triangulation, a traveling salesman problem (TSP) graph, and/or a k-nearest neighbor graph. It will be understood that any minimum entropic graph should be suitable for implementing the present invention. The distance measure is defined as a function of the Euclidean distance of the joint feature space. The dissimilarity measure is defined as the sum of the individual edge distances in the entropic graph, where the edge distances are functions of the Euclidean distance of the joint feature space.

In a step 740, a gradient of the dissimilarity measure is estimated with respect to at least one parameter of a geometric transformation. The estimate of the gradient is computed from the sum of the gradients of the individual distances between vertices of the graph. For the purposes of this disclosure, a gradient of the dissimilarity measure is a vector of partial derivatives of the dissimilarity measure with respect to the parameters of a geometric transformation.

In a step 750, the gradient of the dissimilarity measure is used to update the geometric transformation. In accordance with one embodiment of the present invention, using the gradient of the dissimilarity measure to update the geometric transformation includes using a gradient-based optimization scheme. For example, the gradient-based optimization scheme can be a gradient-descent type optimization scheme.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Hereinafter, a computer readable medium including computer code for aligning images, in accordance with an embodiment of the present invention, is described. The computer readable medium comprises: computer code for sampling a first image and a second image for obtaining a plurality of joint feature pairs; computer code for computing a minimum entropic graph using the joint feature pairs; computer code for measuring the total length of the minimum entropic graph using a distance measure for obtaining a dissimilarity measure; and computer code for minimizing the dissimilarity measure for updating the geometric transformation.

The first and second images are 2-D images, 3-D images, and/or higher-dimensional images. In one embodiment of the present invention, the computer code for computing a minimum entropic graph using the joint feature pairs includes computer code for computing a minimum spanning tree. The joint feature pairs can comprise any pair of vector-valued measures computed from the first and second images.

In accordance with one embodiment of the present invention, the computer code for minimizing the dissimilarity measure for updating the geometric transformation comprises: computer code for estimating a gradient of the dissimilarity measure with respect to at least one parameter of a geometric transformation; and computer code for using the gradient of the dissimilarity measure to update the geometric transformation.

Figure 8:
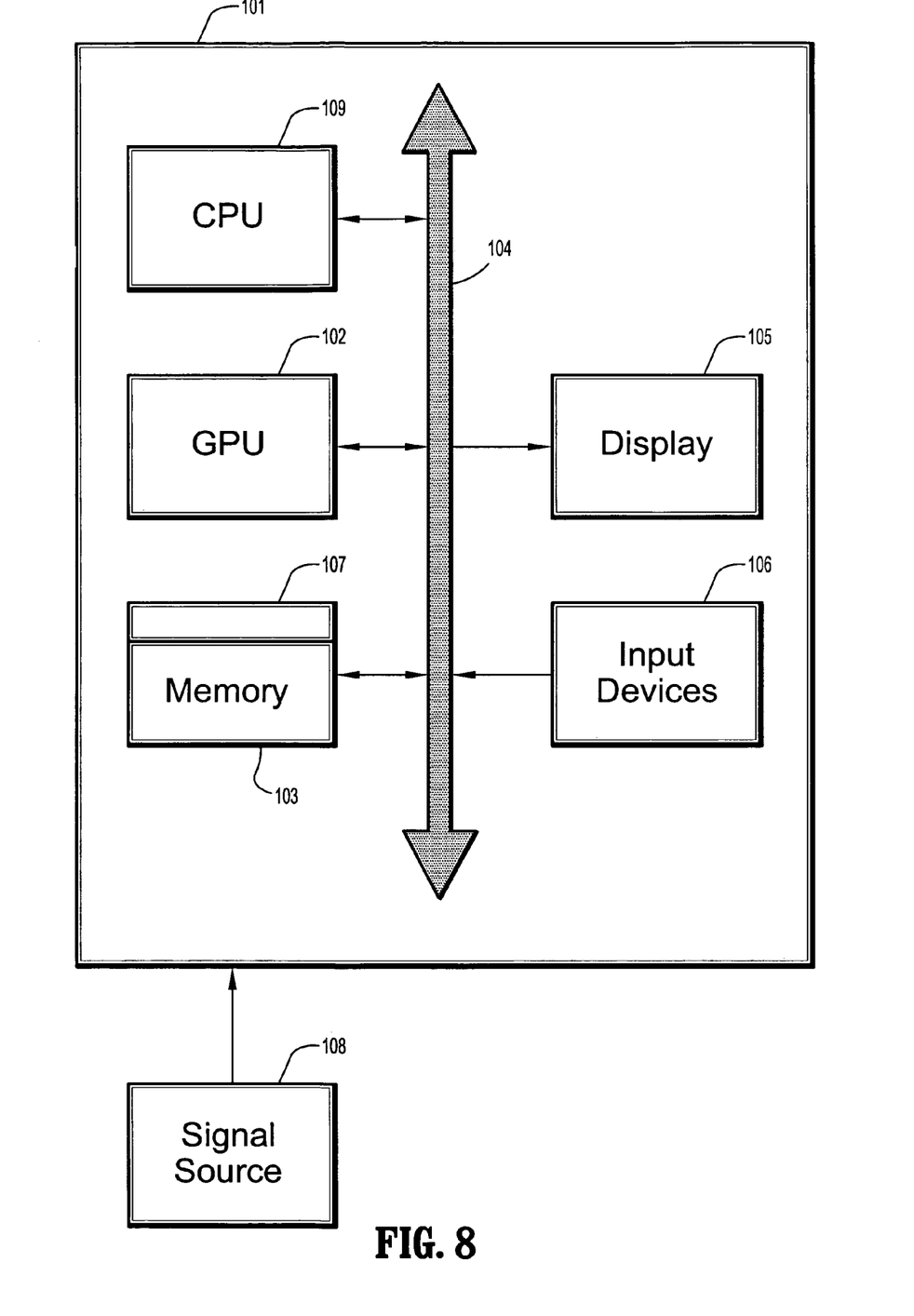
FIG. 8 illustrates a computer system for implementing a method of aligning images, according to an exemplary embodiment of the present invention.

Referring to FIG. 8, according to an embodiment of the present disclosure, a computer system 101 for implementing a method of image segmentation can comprise, inter alia, a central processing unit (CPU) 109, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 109 to process the signal from the signal source 108. As such, the computer system 101 is a general purpose computer system that becomes a specific purpose computer system when executing the routine 107 of the present invention.

The computer platform 101 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Although the processes and apparatus of the present invention have been described in detail with reference to the accompanying drawings for the purpose of illustration, it is to be understood that the inventive processes and apparatus are not to be construed as limited thereby. It will be readily apparent to those of reasonable skill in the art that various modifications to the foregoing exemplary embodiments may be made without departing from the spirit and scope of the invention as defined by the appended claims.

What is claimed is:

1. A method of aligning images comprising:
   sampling a first image and a second image, obtaining a plurality of joint feature pairs;
   computing a minimum entropic graph using the joint feature pairs;
   measuring the total length of the minimum entropic graph using a distance measure, obtaining a dissimilarity measure; and
   minimizing the dissimilarity measure for updating the geometric transformation;
   wherein computing a minimum entropic graph comprises computing a minimum spanning tree; and
   wherein computing a minimum spanning tree comprises:
   computing the Delaunay triangulation of a point set, obtaining a Delaunay triangulation edge set; and
   computing the minimum spanning tree using the Delaunay triangulation edge set and Kruskal's algorithm.

2. A computer readable medium embodying instructions executable by a processor to perform a method of aligning images comprising:
   sampling a first image and a second image, obtaining a plurality of joint feature pairs;
   computing a minimum entropic graph using the joint feature pairs;
   measuring the total length of the minimum entropic graph using a distance measure, obtaining a dissimilarity measure; and
   minimizing the dissimilarity measure for updating the geometric transformation;
   wherein the joint feature pairs are joint feature pairs in a higher-dimensional feature space, wherein computing a minimum entropic graph comprises computing a minimum spanning tree and wherein computing a minimum spanning tree comprises:
   computing the Delaunay triangulation in a reduced-dimensional feature space, wherein the reduced-dimensional feature space is obtained by projection, obtaining a triangulation; and
   computing the minimum spanning tree of the triangulation in the higher-dimensional feature space.

3. A computer readable medium including computer code for aligning images executable by a processor to perform a method of aligning images, the computer readable medium comprising:
   computer code for sampling a first image and a second image for obtaining a plurality of joint feature pairs;
   computer code for computing a minimum entropic graph using the joint feature pairs;
   computer code for measuring the total length of the minimum entropic graph using a distance measure for obtaining a dissimilarity measure; and
   computer code for minimizing the dissimilarity measure for updating the geometric transformation;
   wherein computing a minimum entropic graph comprises computing a minimum spanning tree and
   wherein computer code for computing a minimum spanning tree comprises:
   computer code for computing the Delaunay triangulation of a point set, obtaining a Delaunay triangulation edge set; and
   computer code for computing the minimum spanning tree using the Delaunay triangulation edge set and Kruskal's algorithm.

4. The computer readable medium of claim 3, wherein the computer code for minimizing the dissimilarity measure for updating the geometric transformation comprises:
   computer code for estimating a gradient of the dissimilarity measure with respect to at least one parameter of a geometric transformation; and
   computer code for using the gradient of the dissimilarity measure to update the geometric transformation.

* * * * *